US007969146B2

(12) United States Patent
Christianson et al.

(10) Patent No.: US 7,969,146 B2
(45) Date of Patent: Jun. 28, 2011

(54) DISPLACEMENT MEASUREMENT DEVICE

(75) Inventors: Rollin C. Christianson, Delafield, WI (US); Clyde Bennett Stevens, Columbus, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 581 days.

(21) Appl. No.: 11/748,159

(22) Filed: May 14, 2007

(65) Prior Publication Data
US 2007/0290677 A1 Dec. 20, 2007

(51) Int. Cl.
G01B 7/14 (2006.01)
(52) U.S. Cl. ................... 324/207.24; 324/207.2
(58) Field of Classification Search .............. 324/207.24–207.25, 207.2, 207.26, 324/251; 73/514.16, 514.31, 514.39; 123/612, 123/617; 338/32 R, 32 H
See application file for complete search history.

(56) References Cited

U.S. PATENT DOCUMENTS

| | | | |
|---|---|---|---|
| 3,226,711 A | 12/1965 | Lautzenhiser | |
| 3,243,692 A | 3/1966 | Heissmeier et al. | |
| 3,460,033 A | 8/1969 | Weir et al. | |
| 3,789,876 A | 2/1974 | Kempton et al. | |
| 4,124,814 A | 11/1978 | Lauerman | |
| 4,373,486 A | 2/1983 | Nichols et al. | |
| 4,665,362 A | 5/1987 | Abel et al. | |
| 5,164,668 A | 11/1992 | Alfors | |
| 5,177,370 A | 1/1993 | Meister | |
| 5,303,012 A * | 4/1994 | Horlacher et al. ............. 335/253 |
| 5,621,293 A | 4/1997 | Gennesseaux | |
| 5,806,565 A | 9/1998 | Kadlicko | |
| 5,955,881 A | 9/1999 | White et al. | |
| 6,152,172 A | 11/2000 | Christianson et al. | |
| 6,321,781 B1 | 11/2001 | Kurth | |
| 6,356,072 B1 * | 3/2002 | Chass ..................... 324/207.2 |
| 6,390,036 B1 | 5/2002 | Yuuki | |
| 6,633,157 B1 | 10/2003 | Yamaki et al. | |
| 6,657,847 B1 | 12/2003 | Wright et al. | |
| 6,679,524 B2 | 1/2004 | Greib et al. | |
| 6,725,727 B2 | 4/2004 | Rogers, Jr. et al. | |
| 6,768,406 B1 | 7/2004 | Fiaccabrino | |
| 6,771,065 B2 | 8/2004 | Pointer | |
| 6,851,503 B2 | 2/2005 | Almaraz et al. | |
| 6,919,719 B2 * | 7/2005 | Reininger ................. 324/207.2 |
| 7,166,996 B2 | 1/2007 | Godkin | |
| 7,170,278 B2 * | 1/2007 | Wohner ................. 324/207.24 |
| 7,322,374 B2 * | 1/2008 | Gebauer et al. ............... 137/554 |

(Continued)

FOREIGN PATENT DOCUMENTS

| | | |
|---|---|---|
| EP | 0 172 712 | 8/1985 |
| EP | 174914 | 3/1986 |
| EP | 0 544 576 | 11/1992 |
| WO | 02/066931 | 8/2002 |

OTHER PUBLICATIONS

International Preliminary Report on Patentability for corresponding application No. PCT/US2007/068877.

(Continued)

Primary Examiner — Bot L LeDynh
(74) Attorney, Agent, or Firm — Renner, Otto, Boisselle & Sklar, LLP

(57) ABSTRACT

An displacement measurement device and associated method where displacement measurements of a movable member are obtained by an electromagnetic field sensor that need not move relative to the magnet or other electromagnetic field source. The electromagnetic field sensor senses disruptions in the electromagnetic field caused by movement of the movable member to provide an output indicative of the position of the actuator.

19 Claims, 3 Drawing Sheets

U.S. PATENT DOCUMENTS

| | | | |
|---|---|---|---|
| 2003/0226403 A1 | 3/2003 | Nelson et al. | |
| 2003/0080732 A1 | 5/2003 | Okazaki et al. | |
| 2004/0007125 A1* | 1/2004 | Stobrawe et al. | 92/5 R |
| 2004/0092349 A1* | 5/2004 | Iwamoto et al. | 474/109 |
| 2004/0226183 A1* | 11/2004 | Sielemann | 33/708 |
| 2006/0171091 A1 | 8/2006 | Seale et al. | |
| 2007/0139040 A1* | 6/2007 | Jones et al. | 324/207.17 |
| 2007/0229058 A1* | 10/2007 | Wolf | 324/207.24 |
| 2007/0290677 A1 | 12/2007 | Christianson et al. | |

OTHER PUBLICATIONS

"A1321/2/3 Ratiometric Linear Hall-Effect Sensors for High-Temperature Operation" accessed Apr. 20, 2006, http://www.allegromicro.com/sf/1321, 3 pages.

"Solid State Sensors, Applying Linear Output Hall Effect Transducers", Honeywell Sensing and Control, pp. 84-91.

European Search Report and Written Opinion.

* cited by examiner

DISPLACEMENT MEASUREMENT DEVICE

RELATED APPLICATIONS

This application claims priority of U.S. Provisional Application Nos. 60/799,853 filed May 12, 2006 and 60/808,415 filed May 25, 2006, both of which are hereby incorporated herein by reference.

FIELD OF THE INVENTION

The herein described invention relates generally to electromagnetically actuated devices, such as solenoid-actuated valves, and more particularly to such devices that provide a position output indicative of the position of a position-controlled member of the device. The invention also relates more generally to displacement measurement devices.

BACKGROUND OF THE INVENTION

Heretofore, solenoid actuated valves have used sensors to provide position feedback for control purposes. Linear variable displacement transducers (LVDTs) are well-known and widely used devices that measure the displacement of an armature relative to a coil assembly. One driving coil is used in conjunction with two secondary measurement coils.

Another type of sensor that has been used is a Hall-effect sensor. The Hall-effect sensor is an analog measuring device that provides a varying voltage output in relation to local disruptions of an electromagnetic field. The Hall-effect sensor typically is positioned to interact with a permanent magnet on the armature of the solenoid. The sensor and the magnet move relative to one another in order to vary the voltage output of the sensor thereby provide an indication of position. In a slide-by position sensor arrangement, tight control over the movement path of the armature usually must be maintained to ensure accurate displacement measurement.

SUMMARY OF THE INVENTION

The present invention provides a displacement measurement device and associated method where displacement measurements of a movable member are obtained by an electromagnetic field sensor that need not move relative to the magnet or other electromagnetic field source. The electromagnetic field sensor senses disruptions in the electromagnetic field caused by movement of the movable member to provide an output indicative of the position of the actuator.

Additionally, the present invention provides a novel approach for monitoring the position of a movable member such as an armature of a valve. A coil of the sensing mechanism produces a magnetic field when electrical power is applied to the coil. When electrical power is properly controlled (or fixed at a constant) the flux concentration of the magnetic field is substantially constant, as seen by a field sensor. Movement of the armature through the magnetic field of the coil changes the concentration of magnetic flux seen by the sensor. As a result, the position of the armature (or other movable member) can be determined by monitoring the magnetic field.

According to one aspect of the invention, a valve comprises a body; an armature movable in the body; and a position sensor for determining the position of the armature relative to the body, the position sensor including a source for providing a magnetic field and a member for sensing the magnetic field, the armature changing a value sensed by the member, the value being indicative of the position of the armature relative to the body.

According to another aspect of the invention, a device for measuring displacement of a movable member, comprises a source for providing a magnetic field, a member movable in the magnetic field, and an electromagnetic field sensor for sensing disruptions in the magnetic field at a location in the magnetic field to provide an output indicative of the position of the movable member.

According to another aspect of the invention, a method of measuring the displacement of a movable member, comprises sensing at a location in the an electromagnetic field the disruption in the field caused by movement of the movable member in the field to provide an output indicative of the position of the actuator.

Further features of the invention will become apparent from the following detailed description when considered in conjunction with the drawings.

DETAILED DESCRIPTION

Figure 1:
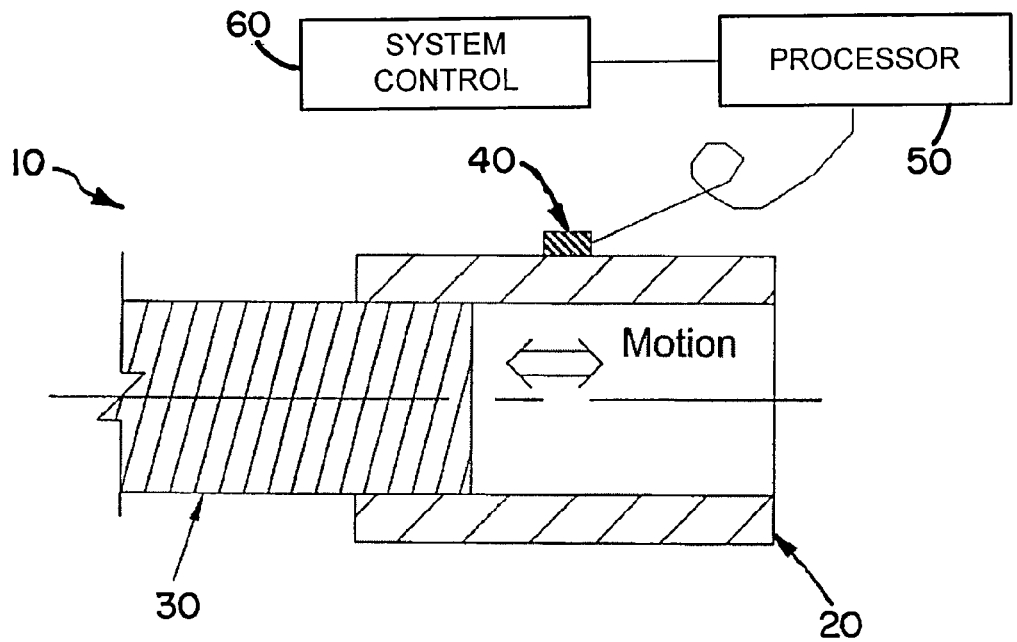
FIG. 1 is a schematic illustration of an exemplary displacement measurement device according to the invention.

Referring now to the drawings in detail and initially to FIG. 1, an exemplary displacement measurement device according to the invention is indicated generally at 10. The device 10 generally comprises a source for providing a magnetic field, such as a permanent magnet 20; a member movable in the magnetic field, such as a plunger or armature 30; and one or more electromagnetic field sensors, such as a Hall-effect sensors 40, for sensing disruptions in the magnetic field at a location (respective locations) in the magnetic field to provide an output indicative of the position of the movable member. Unlike other displacement measurement devices, the field sensor(s) is intended to remain stationary in the magnetic field produced by the source 20. Movement of the member 30 will disrupt the magnetic field and vary the magnetic flux acting on the field sensor 40, whereby the field sensor will output a signal indicative of the position of the member relative to the source. The sensor output can be supplied to a processor (analog and/or digital) 50 configured, as by suitable programming, to process the output of the sensor and provide a position signal or data corresponding to the sensed position of the member 30 that can be used, for example, to provide position feedback, position verification, movement feedback, etc., to an overall system controller 60 that may include the processor 50 as a component thereof. The device may be used in a variety of systems that use displacement sensors and/or feedback controls, such as steer-by-wire systems.

As will be appreciated, other types of field sensors may be employed, although Hall-effect sensors are preferred. Electromagnetic sensors, such as a Hall-effect sensor, are analog measuring devices that provide varying voltage output in relation to local disruptions of an electromagnetic field produced by a permanent magnet(s) or electromagnet(s). Analog sensors, in particular, provide a signal particularly suited for electrical control and monitoring systems.

The movable member 30 may be made of any suitable material, such as a ferromagnetic material, that is operative to disrupt the magnetic field when the armature moves through the field, whereupon the field strengths sensed by the field sensor for given positions of the movable member provide respective unique signals from which the respective positions of the movable member can be derived. Reliance may also be had on the change in field strength (or even the rate of change in field strength) as the movable member moves from position to position in order to provide an accurate indication of the position and/or movement property of the movable member.

Figure 2:
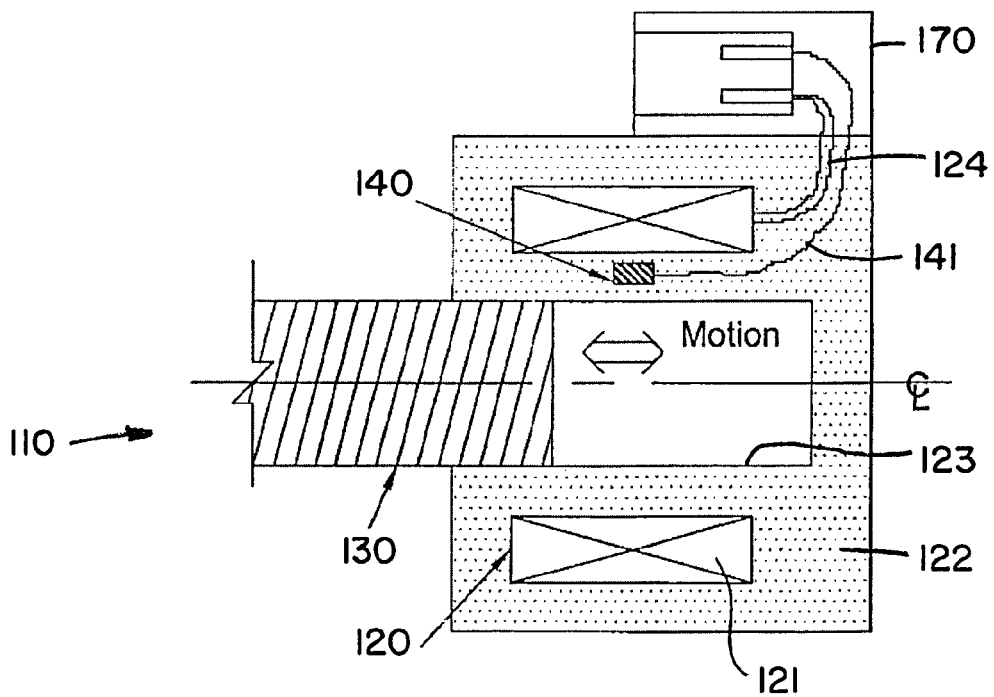
FIG. 2 is a schematic illustration of another exemplary displacement measurement device according to the invention.

As will be appreciated, other types of magnetic field sources may be used. By way of example, FIG. 2 shows an exemplary displacement measurement device 110 including an electromagnet 120 as the magnetic field source. The illustrated exemplary electromagnet 120 includes a coil 121 (multiple coils can also be employed) wound on a bobbin 122 or the like that includes a guide bore 123 (preferably concentric as shown) for the movable member, such as an armature 130. As shown, a field sensor 140 (e.g. Hall-effect sensor) may be suitably positioned in the magnetic field, such as radially inwardly of the coil 121 between the coil and the guide bore 123. The sensor leads 141 may be routed along with the coil leads 124 to a connector 170 for facilitating connection to other system components such as the processor 50 and/or system controller 60 shown in FIG. 1. The leads 141 and 124 may be those conventionally associated with the particular sensor and coil (or coils) used in the device 110.

Figure 3:
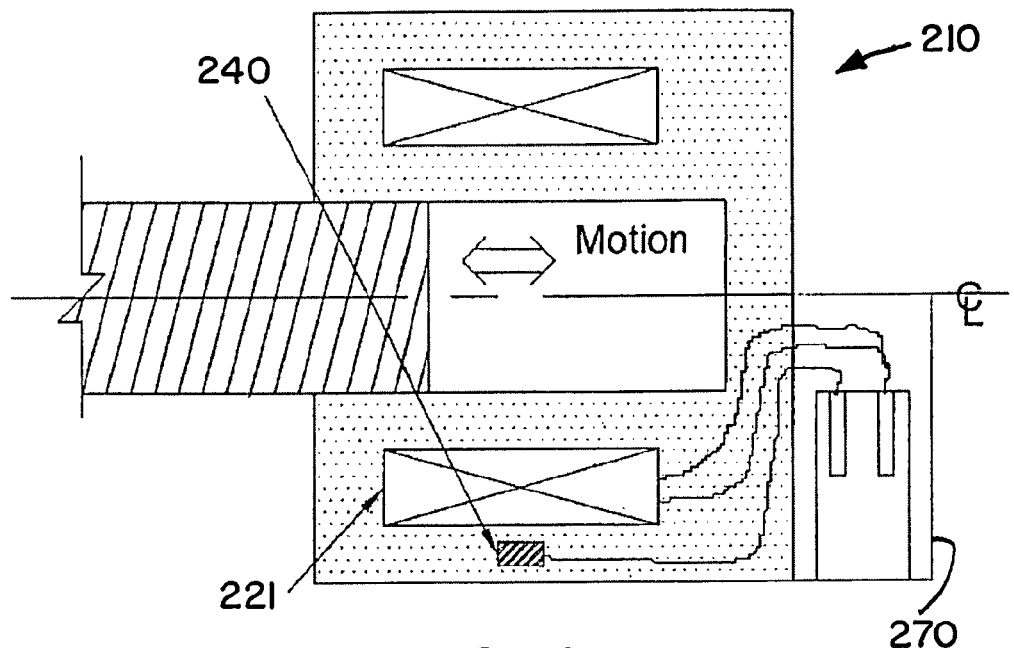
FIG. 3 is a schematic illustration of a further exemplary displacement measurement device according to the invention.

In FIG. 3, another exemplary displacement measurement device 210 is shown. The device 210 is the same as the device 110, except the field sensor 240 is located radially outwardly of the coil 221. Also, the connector 270 is differently oriented.

Figure 4:
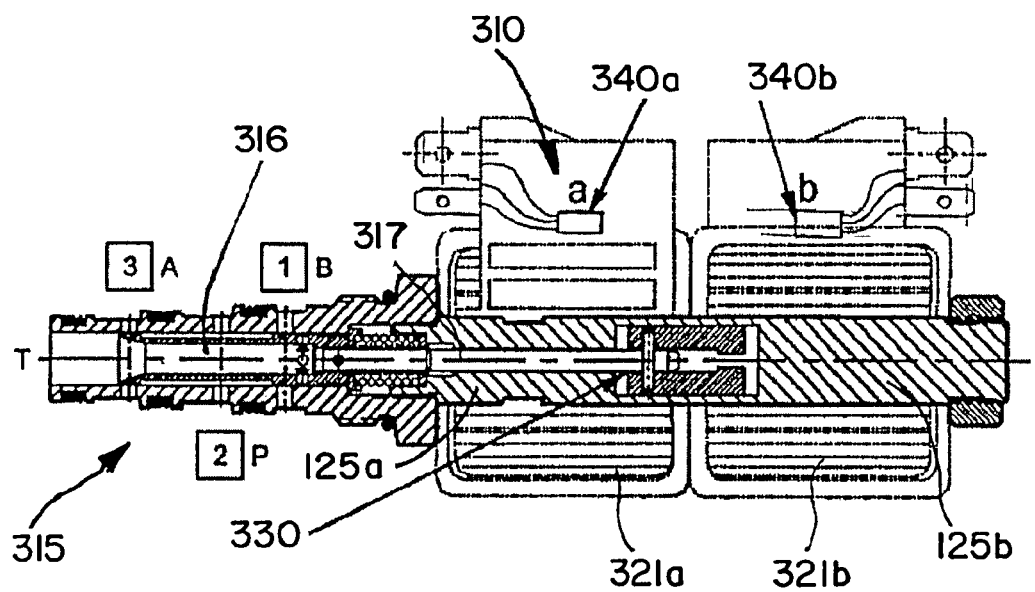
FIG. 4 is a schematic illustration of an exemplary valve application of a displacement measurement device according to the invention.

In FIG. 4, an exemplary application of a displacement measurement device according to the invention is illustrated. Here the device 310 is shown embodied in a solenoid-operated spool valve assembly 315, in particular a cartridge valve assembly. In this embodiment, the device 310 comprises two field sensors 340a and 340b, which may be identical Hall-effect sensors. The sensors 340a and 340b are located in the magnetic fields produced by axially spaced electromagnets, e.g. coils 321a and 321b, that act on a movable member (armature) 330. Upon differential energization of the coils, the armature 330 can be proportionally positioned between opposed pole pieces 125a and 125b. The armature is connected by suitable means to a valve 316 for controlling the position of the valve. In the illustrated embodiment, the armature is connected by a rod 317 to a spool valve member 318 that moves in a valve body for controlling flow between one or more ports of the valve body, as in a conventionally known manner.

As will be appreciated, the coils 321a and 321b additionally function as sources of the magnetic fields sensed by the sensors 340a and 340b that provide signals indicative of the position of the armature. One or both of the sensors may be used to provide position information, such as to a valve controller. As shown, the sensors may have the leads thereof connected to suitable terminals of a connector for convenient connection to a signal processor or system controller. The sensors are also shown conveniently located radially outwardly, and preferably centrally, of the respective coils. As will be appreciated, in the various embodiments the sensor may be located centrally in respect of the longitudinal axis of the magnetic field, although radially offset therefrom. The magnetic field for any given level of energization of the coils will be disrupted by the position of the armature relative to the coils, such that position information can be obtained from the output of the field sensor or sensors by a suitable processor.

In particular embodiments, the sensor may used at standard coil voltage (often 12 or 24 VDC) or a small voltage (could be <5 VDC) with good resolution. Electromagnetic sensors such as Hall-effect and EM sensors can be used for this purpose.

Figure 5:
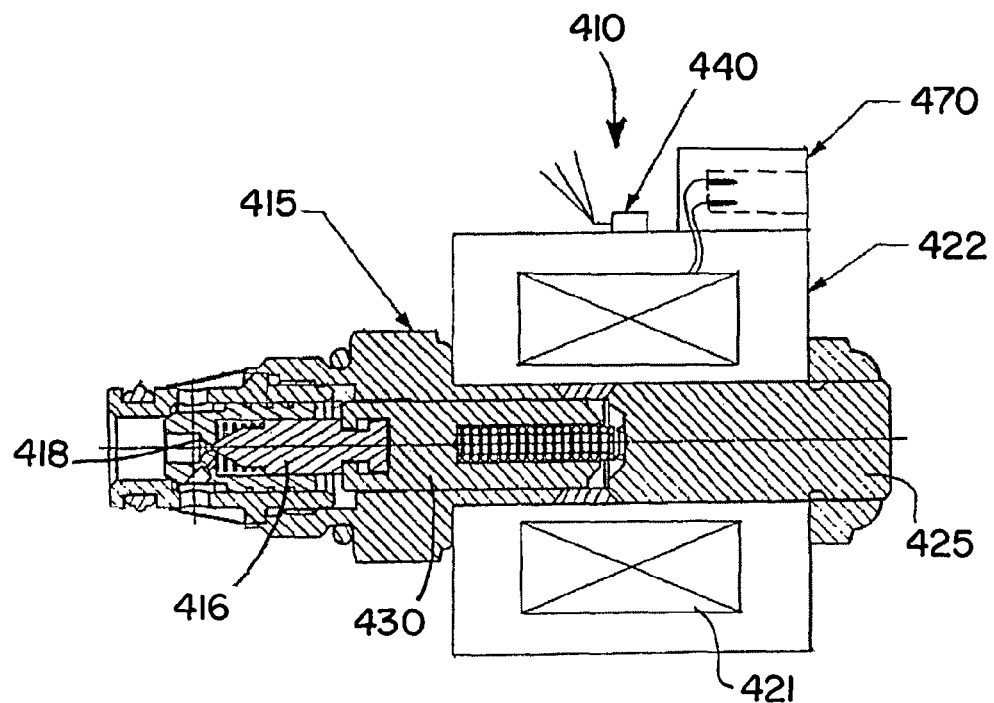
FIG. 5 is a schematic illustration of another exemplary valve application of a displacement measurement device according to the invention.

FIG. 5 shows another exemplary application of a displacement measurement device 410 in a different type of valve assembly 415. The valve assembly 415 includes a solenoid coil 421 wound on a bobbin or the like including a central passage for a movable member, in particular the armature 430. Energization and de-energization of the coil will cause the armature to move towards or away from a pole piece 425, as is known in the art. The armature functions as an actuator for a valve member 416, movement of the armature effecting corresponding movement of the valve member relative to a valve seat 418. The armature and/or valve member may be biased by one or more springs to provide a desired operational configuration of the valve, such as a normally closed or normally open valve configuration.

In the valve assembly 415, the field sensor 440 of the device 410 is located externally of the solenoid housing, but within the magnetic field generated by the solenoid coil (or other magnetic field source). This illustrates how the device can be implemented, for example, to retrofit an existing valve assembly with a displacement measurement device according to the invention. More generally, FIG. 5 illustrates one manner by which existing solenoid valves (or other electromagnetically actuated devices) can be fitted with a low-cost, fast-response, accurate, small footprint displacement sensor.

Figure 6:
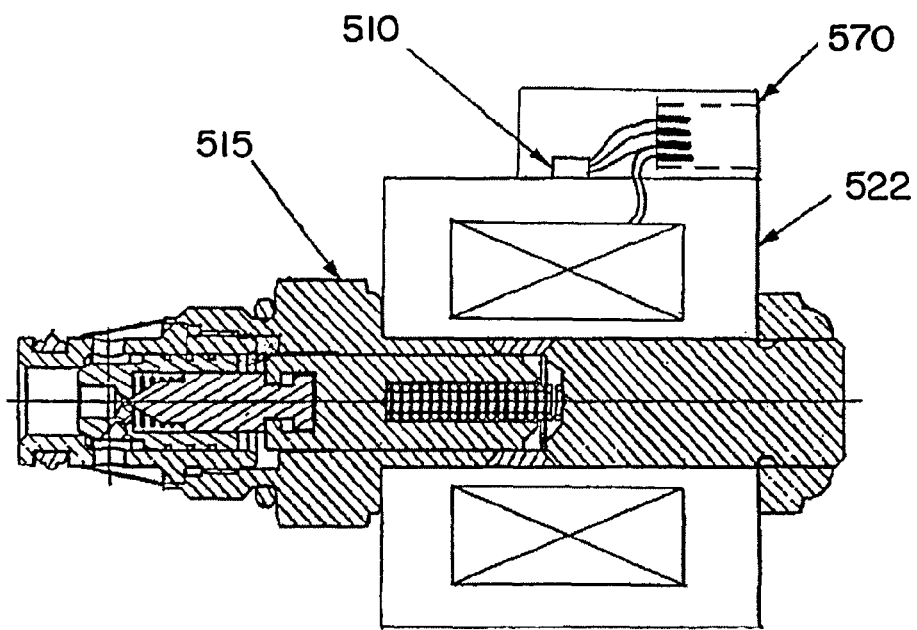
FIG. 6 is a schematic illustration of a further exemplary valve application of a displacement measurement device according to the invention.

FIG. 6 shows a valve assembly 515 that is the same as the valve assembly 415, except the field sensor 540 is integrated into the connector 570 of the solenoid. This provides a convenient means for mounting the field sensor relative to the magnetic field source while also facilitating connection to a signal processor and/or system controller.

As can now be appreciated, the present invention enables displacement measurements that can be used as a way to provide closed-loop feedback controls far more effectively than existing devices, because real-time internal valve motion can be accurately measured. This value is realized whether the valve is operated in proportional or on-off modes. A displacement measurement device can be added non-invasively to existing valve assemblies, or it may have other packaging advantages by including the sensors in the original valve construction. Various options have been herein illustrated and described.

Accordingly, one or more features of the present invention may be used to provide one or more advantages, particularly when an actuator device serves as both an actuator and a highly accurate measuring device. Attainable advantages include: 1) low cost, 2) non-contacting and very robust design, 3) subject to fewer failure modes in operation, 4) fast and accurate analog measurement, and 5) small physical space requirements. Additionally, when a device is used in a sensor mode, anomalous system behaviors can be monitored and valve performance characteristics can be adapted and optimized in real time.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising:
    a body;
    an armature movable in the body along an axis;
    a source for providing a magnetic field in which the armature is movable, the armature being movable by and relative to the source; and
    a position sensor for determining the position of the armature relative to the body over a range of positions between opposite end positions,
    wherein the position sensor includes a member located in the magnetic field for sensing the magnetic field that is disrupted by movement of the armature in the magnetic field, the member radially offset from and axially overlapping the source, the armature movement progressively changing a value sensed by the member, the value being indicative of the position of the armature relative to the body over said range of positions,
    wherein the position sensor is fixed in the body on a side of the source opposite the armature.

2. A valve according to claim 1, wherein the source includes an electro-magnet.

3. A valve as set forth in claim 1, wherein the member is a Hall-effect sensor.

4. A valve as set forth in claim 1, wherein the body includes a flow passage, and a valve member connected to the armature for varying the flow through the flow passage in response to movement of the armature.

5. A device for measuring displacement of a movable member, comprising a source for providing a magnetic field, a member movable in the magnetic field, the movable member being movable by and relative to the source in an axial direction over a range of positions between opposite end positions, and a magnetic field sensor radially offset from and axially overlapping the source and being located in the magnetic field that is disrupted by movement of the member in the magnetic field for sensing disruptions in the magnetic field at a location in the magnetic field to provide an output indicative of the position of the movable member over said range of positions,
    wherein the magnetic field sensor is fixed in the body radially between the source and the member.

6. A device according to claim 5, wherein the source includes an electro-magnet.

7. A device according to claim 6, wherein the member is an armature movable by the magnetic field generated by the electro-magnet.

8. A device according to claim 7, wherein the armature has at least a portion thereof made of a ferromagnetic material.

9. A device according to claim 7, wherein the electro-magnet has a coil, and the magnetic field sensor is located radially inwardly of the coil.

10. A device for measuring displacement of a movable member, comprising a source for providing a magnetic field, a member movable in the magnetic field, the movable member being movable by and relative to the source in an axial direction over a range of positions between opposite end positions, and a magnetic field sensor radially offset from and axially overlapping the source and being located in the magnetic field that is disrupted by movement of the member in the magnetic field for sensing disruptions in the magnetic field at a location in the magnetic field to provide an output indicative of the position of the movable member over said range of positions,
    wherein the source includes an electro-magnet,
    wherein the member is an armature movable by the magnetic field generated by the electro-magnet, and
    wherein the electro-magnet has a coil, and the magnetic field sensor is located radially outwardly of the coil.

11. A device as set forth in claim 5, wherein the sensor is a Hall-effect sensor.

12. A device as set forth in claim 5, wherein the body includes a flow passage, and a valve member connected to the member for varying the flow through the flow passage in response to movement of the member.

13. A method of measuring the displacement of a movable member with the device of claim 5, comprising sensing with the magnetic field sensor, the disruption in the magnetic field caused by movement of the movable member in the magnetic field to provide an output indicative of the position of the movable member over said range of positions.

14. A valve according to claim 1, in combination with a processor for processing the value sensed by the member of the position sensor to provide position information.

15. A valve according to claim 14, in combination with a system controller for using the position information supplied by the sensor.

16. A valve according to claim 1, wherein the position sensor and the source are fixed to the body.

17. A valve comprising,
    a body;
    an armature movable in the body along an axis;
    a source for providing a magnetic field in which the armature is movable, the armature being movable by and relative to the source; and
    a position sensor for determining the position of the armature relative to the body over a range of positions between opposite end positions,
    wherein the position sensor includes a member located in the magnetic field for sensing the magnetic field that is disrupted by movement of the armature in the magnetic field, the member radially offset from and axially overlapping the source, the armature movement progressively changing a value sensed by the member, the value being indicative of the position of the armature relative to the body over said range of positions,
    wherein the position sensor is fixed in the body radially between the source and the armature.

18. The valve according to claim 1, wherein the member axially overlaps a center portion of the source.

19. The device of according to claim 5, wherein the magnetic field sensor axially overlaps a center portion of the source.

* * * * *

UNITED STATES PATENT AND TRADEMARK OFFICE
CERTIFICATE OF CORRECTION

PATENT NO. : 7,969,146 B2  
APPLICATION NO. : 11/748159  
DATED : June 28, 2011  
INVENTOR(S) : Rollin C. Christianson et al.

Page 1 of 1

It is certified that error appears in the above-identified patent and that said Letters Patent is hereby corrected as shown below:

Title page, Section (60), Related U.S. Application Data should be added:
-- Related U.S. Application Data
(60) Provisional application No. 60/799,853 filed on May 12, 2006, provisional application No. 60/808,415 filed on May 25, 2006. --

Signed and Sealed this
Ninth Day of April, 2013

Teresa Stanek Rea
*Acting Director of the United States Patent and Trademark Office*